Figure 1:
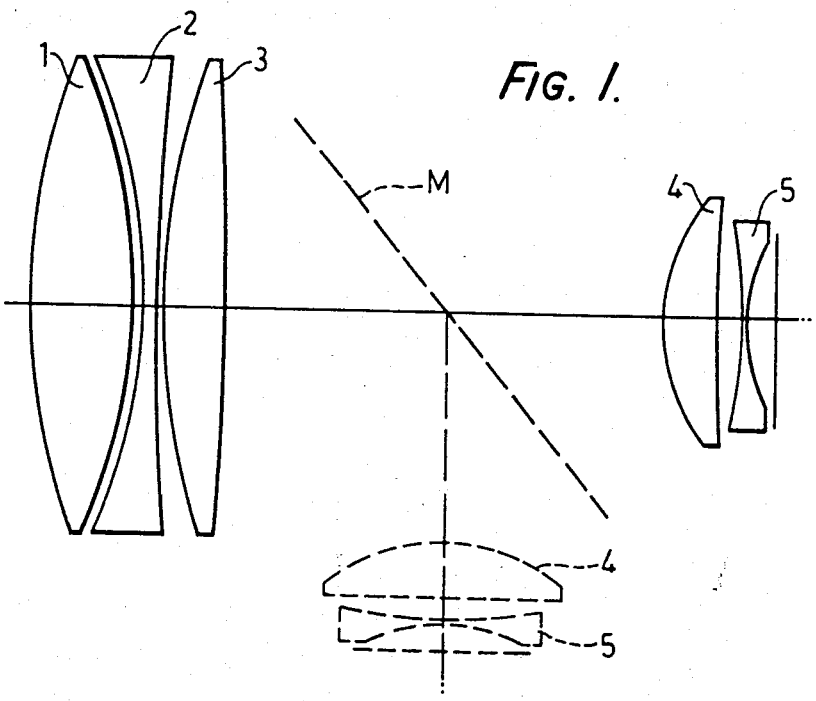

United States Patent
Rogers

[11] 4,232,943
[45] Nov. 11, 1980

[54] MODIFIED PETZVAL LENS

[75] Inventor: Phillip J. Rogers, Meliden, Wales

[73] Assignee: Pilkington P. E. Limited, Lancashire, England

[21] Appl. No.: 971,481

[22] Filed: Dec. 20, 1978

Related U.S. Application Data

[63] Continuation-in-part of Ser. No. 719,361, Sep. 1, 1976, abandoned.

[30] Foreign Application Priority Data

Sep. 13, 1975 [GB] United Kingdom ............... 37722/75

[51] Int. Cl.³ ............................ G02B 9/34; G02B 9/60; G02B 17/06
[52] U.S. Cl. ..................................... 350/202; 350/174; 350/175 FS; 350/216; 350/220
[58] Field of Search .................... 350/202, 216, 175 SF

[56] References Cited
U.S. PATENT DOCUMENTS

| | | | |
|---|---|---|---|
| 2,472,600 | 6/1949 | Luboshez | 350/202 |
| 2,537,996 | 1/1951 | Hankes | 350/202 |
| 3,428,386 | 2/1969 | Schlegel | 350/216 |

Primary Examiner—John K. Corbin
Assistant Examiner—Scott J. Sugarman
Attorney, Agent, or Firm—Mattern, Ware, Davis & Stoltz

[57] ABSTRACT

A collimating magnifier lens which may be used in a head-up display has a focal length of F. The lens has a front part comprising at least one positive element with a focal length between +1 F and +3 F and a negative element with a focal length between −1.2 F and infinity, the focal length of the front part as a whole being between +1 F and +6 F and the negative element of the front part not being cemented to any other element, a rear part comprising a single positive element with a focal length between +0.4 F and +1.2 F, and a field flattener behind the rear part and comprising a single negative element with a focal length between −0.4 F and −1.1 F.

The negative element of the front part may have a refractive index less than or equal to 0.13 greater than that of any positive element of the front part and may be meniscus in shape having a focal length of at least 2.8 times that of the positive component and which produces overcorrect spherical aberration. A single positive element with a focal length between +1.4 F and infinity may be used as a middle part. The air gap in front of the rear part is preferably between 0.6 F and 1.1 F, and the air gap between the rear part and the field flattener is preferably between 0.01 F and 0.5 F. The front part of the lens may have two positive elements. A mirror may be interposed in the gap between the rear and front, or rear and middle.

23 Claims, 9 Drawing Figures

MODIFIED PETZVAL LENS

RELATED APPLICATIONS

This application is a continuation-in-part of my U.S. Pat. application Ser. No. 719,361, filed Sept. 1, 1976, for MODIFIED PETZVAL LENS, now abandoned.

This invention concerns improvements in or relating to lenses and relates more particularly to a collimating magnifier lens suitable for use, for example, in a head-up display.

Head-up display systems are known which use a Petzval lens configuration to achieve a good parallax and distortion performance over a reasonable field of view of approximately 20° and for focal length to diameter ratio of the order of F/1.35. The Petzval configuration is particularly useful for this type of system because it is relatively light in weight, has a long central air gap in which a bending mirror can be placed, and a shorter rear air gap which can be used for the injection of a standby display. The weight of the Petzval system can still be a problem, however, when diameters in excess of about 5" are desired.

It is an object of the present invention to provide a collimating magnifier lens which can be of light weight and have good parallax and distortion performance for low focal length to diameter ratios without the use of expensive aspheric surfaces, and which is particularly, but not exclusively, suitable for use in a head-up display which may include a standby display.

According to the invention there is provided a collimating magnifier lens having a focal length of F, the lens having a front part comprising at least one positive element with a focal length between $+1F$ and $+3F$ and a negative element with a focal length between $-1.2F$ and infinity, the focal length of the front part as a whole being between $+1F$ and $+6F$ and the negative element of the front part not being cemented to any other element, a rear part comprising a single positive element with a focal length between $+0.4F$ and $+1.2F$, and a field flattener behind the rear part and comprising a single negative element with a focal length between $-0.4F$ and $-1.1F$.

The negative element in the front part of the lens and not cemented to any other element may have a power sufficient to effect partial correction of chromatic aberrations, but when chromatic correction can be ignored or given a low priority the power of the negative element need not be great. A low power negative element can, if desired, be meniscus in shape to produce an amount of overcorrect spherical aberration that is sufficient to correct the residual undercorrect spherical aberration from the rest of the optical system.

The lens may further comprise a middle part located between the front and rear parts, the middle part comprising a single positive element with a focal length between $+1.4F$ and infinity. The air gap in front of the rear part is preferably between $0.6F$ and $1.1F$, and can control astigmatism and distortion. The equivalent air gap between the rear part and the field flattener is preferably between $0.01F$ and $0.5F$.

The front part of the lens may have two positive elements, the front positive element preferably having a focal length between $+6F$ and infinity. The use of two positive elements in the front part can assist in the achievement of a high aperture.

If an angled system is desired a mirror which bends the light path may be interposed in the gap between the rear and front, or rear and middle, parts of the lens.

A prism with a partially reflecting interface may be interposed between elements of the lens for the injection of light, and in particular may be interposed between the rear part and the field flattener. There may be a plano-convex lens element cemented to the input face of the light injection prism to achieve spherical aberration compensation in the injected light channel.

The present invention further provides a head-up display incorporating a lens as set forth above. The head-up display may be provided with a standby display by injection of light through a prism interposed between elements of the lens as set forth above and a field flattener and/or a plano-convex lens element may be provided in the standby channel.

Figure 2:
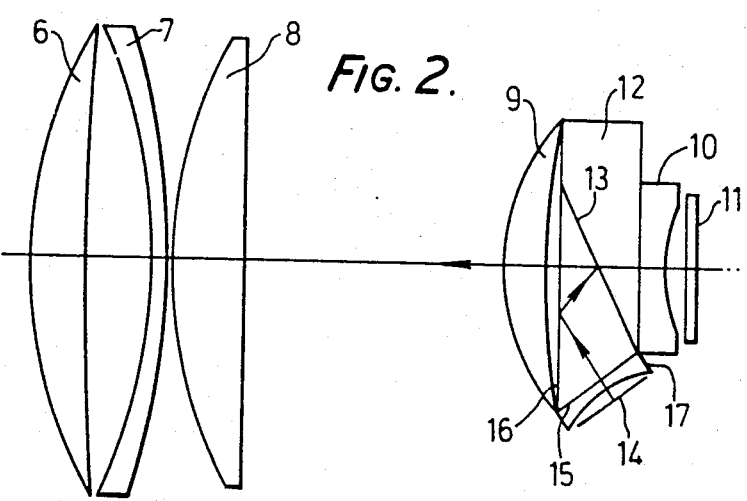
Figure 3:
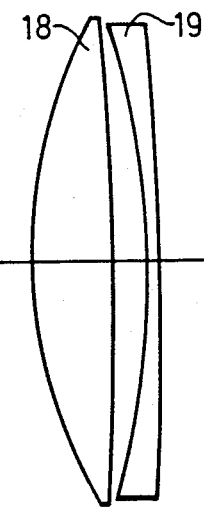
Figure 3:
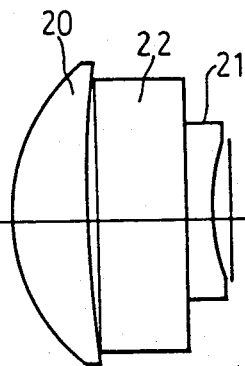
Figure 4:
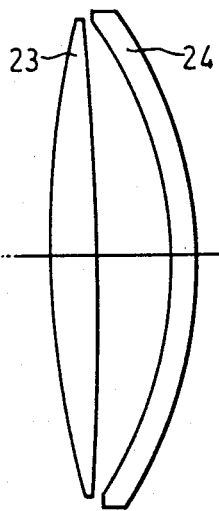
Figure 4:
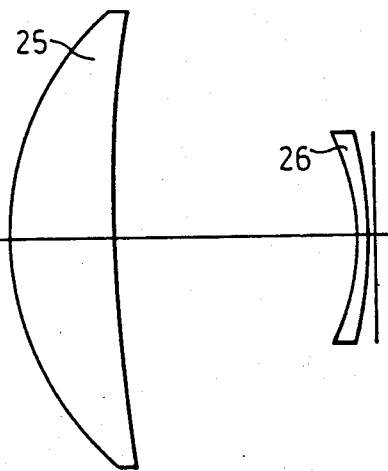
Figure 4A:
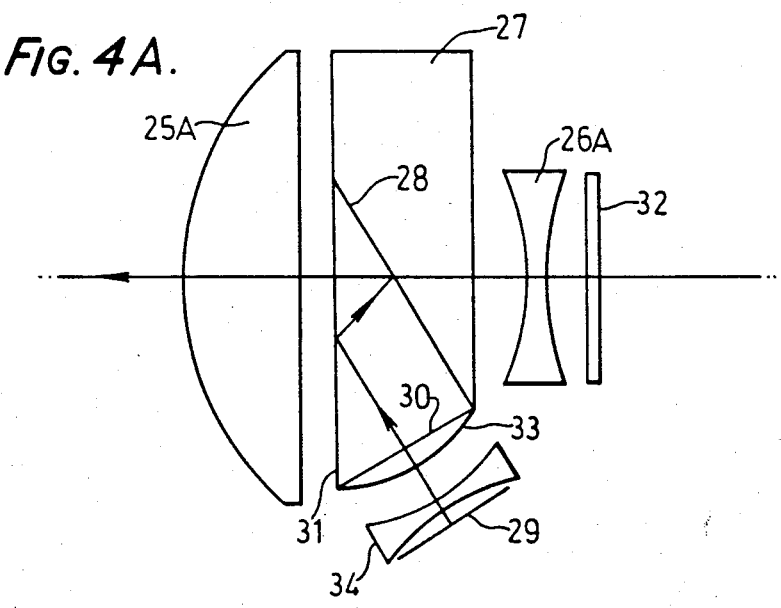
Figure 5:
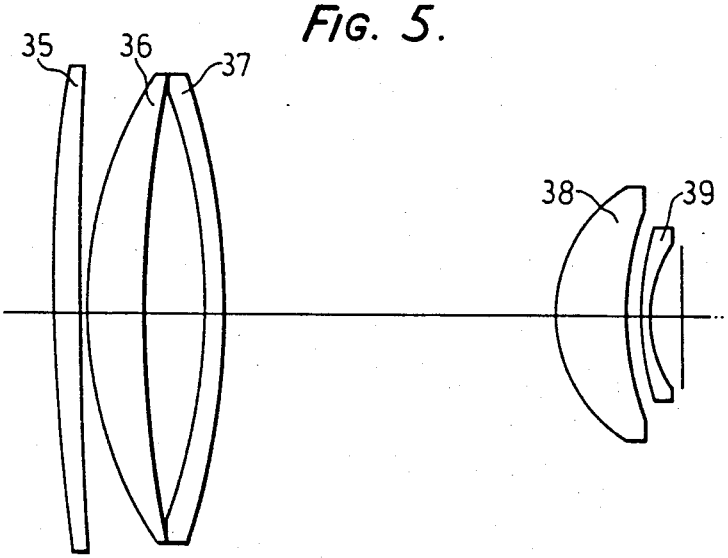
Figure 5A:
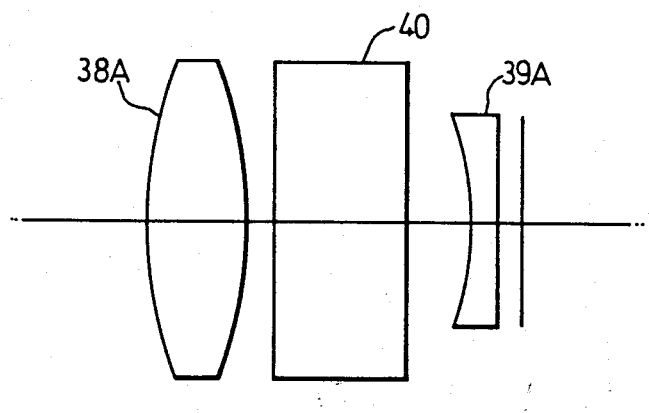
Figure 6:
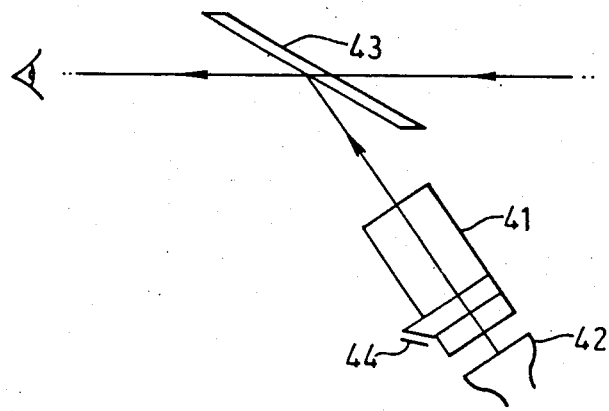
Figure 7:
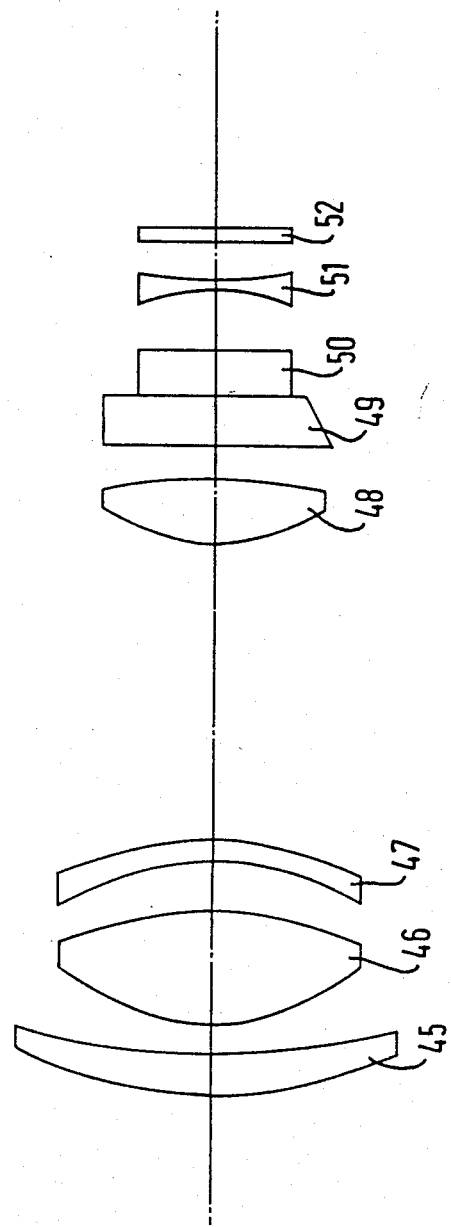

Embodiments of collimating magnifier lenses in accordance with the invention will now be described by way of example with reference to the accompanying drawings in which:

FIG. 1 is a schematic representation of a first embodiment,

FIG. 2 is a schematic representation of a second embodiment including provision for injection of light from a standby display, FIG. 3 is a schematic representation of a third embodiment, FIG. 4 is a schematic representation of a fourth embodiment, FIG. 4A shows an adaptation of the FIG. 4 embodiment to include provision for injection of light from a standby display, FIGS. 5 and 7 are schematic representations of further embodiments, FIG. 5A shows an adaptation of the FIG. 5 embodiment to include provision for injection of light from a standby display, and FIG. 6 is a schematic representation of a head-up display.

The embodiment of lens shown in FIG. 1 has a front part consisting of a positive bi-convex element 1 and a negative bi-concave element 2 not cemented to any other element, a middle part consisting of a single positive bi-convex element 3, and a rear part consisting of a single positive meniscus element 4 convex to the front behind which is a single negative bi-concave field flattening element 5. This embodiment has partial correction of chromatic aberrations due to the power of the negative element 2 in the front part, this element having a double concave shape (as distinct from meniscus). If desired a mirror M may be placed in the air gap between the elements 3 and 4 to achieve an angled system (the elements 4 and 5 then occupying the positions shown in broken line). Further, the mirror M may be a thin dichroic green reflecting/red transmitting mirror, and the angled system shown by the broken line elements 4 and 5 used for a main head-up display while the straight through system is used for the injection of a red standby display. Alternatively, of course, the main and standby systems could be reversed by reversing the dichroic mirror characteristics.

A particular example of lens in accordance with the embodiment of FIG. 1 has numerical values as given in the following table.

EXAMPLE I

| ELE-MENT | RADIUS | AXIAL THICKNESS/ SEPARATION | REFRACTIVE INDEX Nd | CONSTRINGENCE Vd |
|---|---|---|---|---|
| 1 | +146.608 | 18.774 | 1.62040 | 60.3 |
|   | −132.244 | 2.772 | | |
| 2 | −115.569 | 2.903 | 1.74842 | 27.8 |
|   | +744.569 | 0.138 | | |
| 3 | +117.416 | 13.396 | 1.68880 | 49.5 |
|   | −1530.6-15 | 89.823 | | |
| 4 | +38.031 | 11.087 | 1.74400 | 44.7 |
|   | +4964.7-71 | 4.404 | | |
| 5 | −140.909 | 1.106 | 1.70035 | 30.3 |
|   | +46.980 | | | |

EFL = 100, Aperture = F/1.08, Field of View = 20°

| Focal length Ratios: | 1 | 2 | 3 | 4 | 5 |
|---|---|---|---|---|---|
| | +1.146F | −1.324F | +1.581F | +0.512F | −0.502F |

Constringence is a term used in the United Kingdom for the reciprocal normalized dispersion or Abbe number.

The embodiment shown in FIG. 2 has a front part consisting of a positive meniscus element 6 convex to the front and a low power negative meniscus element 7 concave to the front and not cemented to any other element, a middle part consisting of a single positive convex-plano elements, and a rear part consisting of a single positive meniscus element 9 convex to the front behind which is a single negative plano-concave field flattening element 10. Behind the field flattening element is a cathode ray tube face plate 11 (providing a main display) and between the elements 9 and 10 is a prism block 12 through which a standby display can be injected and which is cemented to the planar face of the field flattening element 10. The block 12 has a partially reflecting interface 13 angled relative to the optical axis so that light from a standby display source 14 entering the prism through an inclined face 15 is internally reflected from its front face 16 towards the interface 13 to be reflected therefrom forwardly. Such light can therefore travel forwardly in the same direction as light from the cathode ray tube face plate 11 (providing the main display) which is transmitted through the interface 13. A field flattening plano-concave element 17 is cemented to the input face 15 of the prism block 12 to achieve parallax and distortion figures for the standby system of similar accuracy to those of the main system (the path lengths in the main and standby systems being approximately similar). The standby display should preferably be narrow in azimuth but there is no particular limit in height.

The embodiment of FIG. 2 has a lower correction of chromatic aberration than the embodiment of FIG. 1 because the weak negative element 7 in the front part is of lower power than the corresponding element 2 in FIG. 1. However, the FIG. 2 embodiment can generally achieve a higher aperture than the FIG. 1 embodiment. The FIG. 2 embodiment is best suited to a "straight through" system with no bending mirror being involved but a bending mirror could be inserted in the air gap between the elements 8 and 9 if some vignetting of the vertical field of view can be tolerated.

A particular example of lens in accordance with the embodiment of FIG. 2 has numerical values as given in the following table.

EXAMPLE II

| ELE-MENT | RADIUS | AXIAL THICKNESS/ SEPARATION | REFRACTIVE INDEX Nd | CONSTRINGENCE Vd |
|---|---|---|---|---|
| 6 | +132.916 | 15.676 | 1.51650 | 64.2 |
|   | +1088.136 | 16.692 | | |
| 7 | −154.232 | 5.080 | 1.62096 | 35.9 |
|   | −215.741 | 0.290 | | |
| 8 | +113.331 | 21.191 | 1.51650 | 64.2 |
|   | PLANO | 71.847 | | |
| 9 | +50.157 | 13.063 | 1.71300 | 53.8 |
|   | +205.750 | 2.758 | | |
| 12 + 10 (12 + 17) | PLANO | 29.668 (34.835) | 1.80518 | 25.4 |
|   | +81.543 | 3.632 (2.339) | | |
| 11 (14) | PLANO | 2.148 | 1.62040 | 60.3 |
|   | PLANO | | | |

EFL = 100, Aperture = F/0.8, Field of View = 20°

| Focal Length Ratios: | 6 | 7 | 8 | 9 | 10 |
|---|---|---|---|---|---|
| | +2.900F | −8.362F | +2.18F | +0.893F | −0.999F |

The embodiment shown in FIG. 3 has a front part consisting of a positive bi-convex element 18 and a low power negative meniscus element 19 concave to the front and not cemented to any other element, and a rear part consisting of a single positive meniscus element 20 convex to the front behind which is a single negative plano-concave field flattening element 21. This embodiment does not have a middle part, i.e. can be considered as one in which the focal length of the middle part has been allowed to go to infinity and the middle part is therefore omitted. The use of high refractive index material for the positive element 18 in the front part enables a high aperture to be achieved. A mirror can be placed in the air gap between the elements 19 and 20 to achieve an angled system if desired. A standby display injection can be achieved via a prism block 22 cemented to the field flattening element 21 in the same way as described above relative to the FIG. 2 embodiment.

A particular example of lens in accordance with the embodiment of FIG. 3 has numerical values as given in the following table.

EXAMPLE III

| ELE-MENT | RADIUS | AXIAL THICKNESS/ SEPARATION | REFRAC-TIVE INDEX Nd | CON-STRIN-GENCE Vd |
|---|---|---|---|---|
| 18 | +120.567 | 21.885 | 1.71300 | 53.8 |
|  | −1506.931 |  |  |  |
|  |  | 7.003 |  |  |
|  | −269.096 |  |  |  |
| 19 |  | 5.107 | 1.58406 | 37.0 |
|  | −865.060 |  |  |  |
|  |  | 100.672 |  |  |
|  | +47.597 |  |  |  |
| 20 |  | 21.885 | 1.74400 | 44.7 |
|  | +1714.869 |  |  |  |
|  |  | 0.730 |  |  |
|  | PLANO |  |  |  |
| 22 + 21 |  | 32.098 | 1.95250 | 21.5 |
|  | +72.951 |  |  |  |

EFL = 100, Aperture = F/0.8, Field of View = 20°

| Focal Length Ratios: | 18 | 19 | 20 | 21 |
|---|---|---|---|---|
|  | +1.565F | −6.647F | +0.649F | −0.753F |

The embodiment shown in FIG. 4 has a front part consisting of a positive bi-convex element 23 and a low power negative meniscus element 24 concave to the front and not cemented to any other element, and a rear part consisting of a single positive meniscus element 25 convex to the front behind which is a single negative meniscus field flattening element 26 concave to the front. This embodiment is similar to that of FIG. 3 (omitting any middle part) except that the field flattening element 26 is meniscus as distinct from the plano-concave field flattening element 21 in FIG. 3. A mirror can be placed in the air gap between the elements 24 and 25 to achieve an angled system if desired.

A particular example of lens in accordance with the embodiment of FIG. 4 has numerical values as given in the following table.

EXAMPLE IV

| ELE-MENT | RADIUS | AXIAL THICKNESS/ SEPARATION | REFRAC-TIVE INDEX Nd | CON-STRIN-GENCE Vd |
|---|---|---|---|---|
| 23 | +150.787 | 8.688 | 1.62040 | 60.3 |
|  | −565.064 |  |  |  |
|  |  | 12.698 |  |  |
|  | −69.808 |  |  |  |
| 24 |  | 4.277 | 1.51742 | 52.2 |
|  | −73.358 |  |  |  |
|  |  | 65.040 |  |  |
|  | +49.807 |  |  |  |
| 25 |  | 18.045 | 1.51650 | 64.2 |
|  | +320.733 |  |  |  |
|  |  | 42.481 |  |  |
|  | −38.163 |  |  |  |
| 26 |  | 1.711 | 1.74877 | 27.8 |
|  | −106.497 |  |  |  |

EFL = 100, Aperture = F/1.25, Field of View = 20°

| Focal Length Ratios: | 23 | 24 | 25 | 26 |
|---|---|---|---|---|
|  | +1.920F | −47.232F | +1.112F | −0.797F |

A standby display injection can be achieved in the form of embodiment shown in FIG. 4 via a prism block inserted between the rear part element 25 and the field flattening element 26 by adapting the configuration in this area to that shown in FIG. 4A in which the element 25A (corresponding to 25 in FIG. 4) is shown as convex-plano (although the rear face may be slightly convex or slightly concave), and the field flattening element 26A (corresponding to 26 in FIG. 4) is bi-concave. The standby injection prism block 27 inserted between these elements has a partially reflecting interface 28 inclined to the optical axis so that light from a standby display source 29 entering the prism through an inclined face 30 is internally reflected from the front face 31 of the prism towards the interface 28 and is reflected thereby to travel forwardly, i.e. in the same direction as light from a cathode ray tube face plate 32 (providing a main display) which is transmitted through the interface 28.

If the prism block 27 is to be kept thin (and therefore light in weight) there will generally be a considerably longer glass path length in the standby channel than in the main display channel. The excess of over-correct spherical aberration produced in the standby channel can be considerably reduced by cementing a plano-convex lens element 33 onto the input face 30 of the prism 27. A field flattening bi-concave element 34 can then be placed close to the standby display source 29. The standby display should preferably be narrow in azimuth but there is no particular limit in height.

The embodiment shown in FIG. 5 omits any middle part (like the FIGS. 3 and 4 embodiments) but, in order to achieve a high aperture without having to use a very high refractive index material, the positive element in the front part is effectively split into two positive elements. Thus the FIG. 5 embodiment has a front part consisting of a first positive meniscus element 35 convex to the front, a second positive meniscus element 36 convex to the front and a low power negative meniscus element 37 concave to the front, and a rear part consisting of a single positive meniscus element 38 convex to the front behind which is a single negative meniscus field flattening element 39 convex to the front. A mirror can be placed in the air gap between the elements 37 and 38 to achieve an angled system if desired as described above relative to FIG. 1.

A particular example of lens in accordance with the embodiment of FIG. 5 has numerical values as given in the following table.

EXAMPLE V

| ELE-MENT | RADIUS | AXIAL THICKNESS/ SEPARATION | REFRAC-TIVE INDEX Nd | CON-STRIN-GENCE Vd |
|---|---|---|---|---|
| 35 | +443.085 | 7.971 | 1.63854 | 55.5 |
|  | +15816.-588 |  |  |  |
|  |  | 0.145 |  |  |
|  | +105.648 |  |  |  |
| 36 |  | 16.667 | 1.71300 | 53.8 |
|  | +348.241 |  |  |  |
|  |  | 15.217 |  |  |
|  | −192.474 |  |  |  |
| 37 |  | 5.072 | 1.48749 | 70.4 |
|  | −231.826 |  |  |  |
|  |  | 91.487 |  |  |
|  | +35.450 |  |  |  |
| 38 |  | 20.290 | 1.78443 | 43.9 |
|  | +115.490 |  |  |  |
|  |  | 4.007 |  |  |

-continued

| ELE-MENT | RADIUS | AXIAL THICKNESS/ SEPARATION | REFRAC-TIVE INDEX Nd | CON-STRIN-GENCE Vd |
|---|---|---|---|---|
| 39 | +94.291 | 1.739 | 1.74842 | 27.8 |
|  | +36.232 |  |  |  |

EFL = 100, Aperture = F/0.8, Field of View = 20°

| Focal Length Ratios: | 35 | 36 | 37 | 38 | 39 |
|---|---|---|---|---|---|
|  | +7.107F | +2.05F | −24.203F | +0.583F | −0.790F |

Focal length of elements 35 and 36 in combination = 1.59F

It will be appreciated that the focal length of the first positive element 35, which is preferably not less than +6F, can approach infinity since infinite focal length for this element is equivalent to its being omitted, thus providing a front part with a single positive element in front of the negative element as illustrated by the embodiments of FIGS. 1 to 4.

A standby display injection can be achieved in the form of embodiment shown in FIG. 5 via a prism block inserted between the rear part element 38 and the field flattening element 39 by adapting the configuration in this area to that shown in FIG. 5A in which the element 38A (corresponding to 38 in FIG. 5) is shown as bi-convex (although the rear face may be planar or slightly concave) and the field flattening element 39A (corresponding to 39 in FIG. 5) is shown as concave-plano (although this element may have any shape which renders it negative). The prism block 40 inserted between these elements can have the same standby display injection arrangement as described above with reference to FIG. 4A.

In the above tables the units of length are millimeters but it will be understood that the dimensions are relative and can be scaled accordingly.

The embodiments of lenses shown in FIGS. 1 to 5 are all particularly suitable for use in a head-up display, which may be provided with a stand-by display. FIG. 6 schematically illustrates a head-up display in which the lens is indicated as 41. Light carrying a main display image from a cathode ray tube 42 travels through the collimating magnifier lens 41 to a partially reflecting combiner plate 43. The combiner plate 43 reflects the light towards an observer's eyes E who therefore sees an image of the display superimposed on his view of the outside scene through the combiner plate 43. A standby display source 44, such as an illuminated graticule, may be provided for injection of a standby display in a manner as described above.

The principal weight constraint in a head-up display optical system is generally the requirement for the correction of chromatic effects to a degree which prevents colour fringing even over the spectral bandwidth covered by typical green phosphors. The development of almost monochrome rare-earth phosphors has much reduced this requirement and, even with normal phosphors, some colour fringing towards the edge of the field of view is sometimes tolerable as the position of the centre of an off-axis symbol in the display can still be determined accurately. Selective filtering using glass or dichroic filters, or a combination of both, can also considerably reduce the colour fringing though at the expense of some brightness. If chromatic correction is ignored or given a low priority, spherical aberration correction is still required and can be achieved by the use of a low power negative element (not cemented to any other element) in the front part of the lens. The focal length of the negative element, which should not in any case be less than −1.2F, can therefore be long (see e.g. Example IV) and can effectively approach infinity. The negative element can, if necessary, be given a meniscus shape (Examples II, III, IV and V) which enables it to produce a considerable amount of overcorrect spherical aberration.

The front part of the lens should include, in addition to the negative element, a positive element having a focal length between 1F and 3F, and the front part as a whole should be positive in power and have a focal length between +1F and +6F. In the particular examples set forth above the front part as a whole has a focal length as follows:

| Example | Focal length of front part |
|---|---|
| I | +5.79F |
| II | +4.16F |
| III | +1.98F |
| IV | +2.04F |
| V | +1.60F |

The middle part of the lens when included (Examples I and II) should be a single positive element having a focal length not less than 1.4F. The focal length of this element can approach infinity as illustrated by the fact that it can effectively have infinite focal length and therefore be omitted (Examples III, IV and V).

The air gap in front of the rear part should preferably be between 0.6F and 1.1F.

The rear part of the lens should be a single positive element of focal length between 0.4F and 1.2F.

The field flattener behind the rear part should be a single negative element of focal length between −0.4F and −1.1F, and the equivalent air gap between the rear part and the field flattener should preferably be between 0.01F and 0.5F.

The above indicated ranges have been found by a systematic procedure of iteration applied to potentially successful configurations, the procedure including a suitable choice of glass types, spacings, thicknesses and curvatures which give a balance of aberrations with a sufficiently small residual component in all parts of the field as will be well understood by those skilled in the art.

It will be seen that in all the above examples the refractive index of the negative element in the front part is less than or equal to 0.13 greater than the refractive index of any positive element in the front part. Specifically, the relative refractive indices are as follows.

EXAMPLE I

Positive element 1 Nd = 1.62
Negative element 2 Nd = 1.75
Refractive index of negative element 0.13 greater than that of positive element.

EXAMPLE II

Positive element 6 Nd = 1.52
Negative element 7 Nd = 1.62
Refractive index of negative element 0.10 greater than that of positive element.

EXAMPLE III

Positive element 18 Nd=1.71
Negative element 19 Nd=1.58
Refractive index of negative element 0.13 less than that of positive element.

EXAMPLE IV

Positive element 23 Nd=1.62
Negative element 24 Nd=1.52
Refractive index of negative element 0.10 less than that of positive element.

EXAMPLE V

Positive element 35 Nd=1.64
Positive element 36 Nd=1.71
Negative element 37 Nd=1.49
Refractive index of negative element 0.15 less than that of one positive element and 0.22 less than that of the other positive element.

It will be appreciated that by avoiding the need for a high refractive index for the negative element, a lower density glass can be used and the weight of the element can be correspondingly light.

FIG. 7 illustrates a further embodiment having similarities, as indicated below, to those described above. In the FIG. 7 embodiment the front part of the lens consists of a positive meniscus element 45 convex to the front (similar to the meniscus element 35 in FIG. 5), a positive bi-convex element 46 and then a low power negative meniscus element 47 concave to the front and not cemented to any other element (these elements 46 and 47 being basically similar to elements 23 and 24 in FIG. 4). The rear part of the lens in FIG. 7 consists of a positive singlet bi-convex element 48 behind which is a standby injection prism block 49 having a glass block 50 cemented to its rear face. Then follows a negative bi-concave field flattening element 51 behind which is a main display cathode ray tube face plate 52. It will be seen that these parts of the FIG. 7 embodiment are basically similar to the arrangement shown in FIG. 4A (the elements 48, 49, 51 and 52 in FIG. 7 corresponding respectively to elements 25A, 27, 26A and 32 in FIG. 4A).

Particular examples of lenses in accordance with the FIG. 7 embodiment have numerical values as follows.

EXAMPLE VI

| ELE-MENT | RADIUS | AXIAL THICKNESS/ SEPARATION | REFRAC-TIVE Nd | CON-STRIN-GENCE Vd |
|---|---|---|---|---|
| 45 | +338.430 | | | |
| | | 5.328 | 1.48749 | 70.41 |
| | +1200.222 | | | |
| | | 0.355 | | |
| | +123.338 | | | |
| 46 | | 15.484 | 1.48749 | 70.41 |
| | −220.187 | | | |
| | | 3.552 | | |
| | −152.639 | | | |
| 47 | | 3.374 | 1.80518 | 25.43 |
| | −253.324 | | | |
| | | 87.036 | | |
| | +64.220 | | | |
| 48 | | 19.581 | 1.71500 | 53.83 |
| | −962.743 | | | |
| | | 7.773 | | |
| | PLANO | | | |
| 49 | | 15.096 | 1.80518 | 25.43 |
| | PLANO | | | |
| 50 | | 13.155 | 1.62096 | 35.90 |
| | PLANO | | | |
| | | 4.700 | | |
| | −71.339 | | | |
| 51 | | 1.539 | 1.80518 | 25.43 |
| | +246.062 | | | |
| | | 1.576 | | |
| | PLANO | | | |
| 52 | | 2.495 | 1.52249 | 59.48 |
| | PLANO | | | |

EFL = 100, Aperture = F/1.10, Field of View = 25°

| Focal | 45 | 46 | 47 | 48 | 51 |
|---|---|---|---|---|---|
| Length Ratios: | +9.60F | +1.64F | −4.78F | +0.85F | −0.68F |

Focal length of elements 45 and 46 in combination=+1.41F

EXAMPLE VII

| ELE-MENT | RADIUS | AXIAL THICKNESS/ SEPARATION | REFRAC-TIVE INDEX Nd | CON-STRIN-GENCE Vd |
|---|---|---|---|---|
| 45 | +171.490 | | | |
| | | 6.803 | 1.48749 | 70.41 |
| | +846.481 | | | |
| | | 0.363 | | |
| | +125.746 | | | |
| 46 | | 13.606 | 1.48749 | 70.41 |
| | −301.450 | | | |
| | | 3.628 | | |
| | −201.061 | | | |
| 47 | | 3.447 | 1.80518 | 25.43 |
| | −462.319 | | | |
| | | 87.076 | | |
| | +60.234 | | | |
| 48 | | 19.955 | 1.71300 | 53.83 |
| | −464.676 | | | |
| | | 0.363 | | |
| | PLANO | | | |
| 49 | | 15.420 | 1.80518 | 25.43 |
| | PLANO | | | |
| 50 | | 6.794 | 1.62096 | 36.18 |
| | PLANO | | | |
| | | 7.987 | | |
| | −73.347 | | | |
| 51 | | 1.814 | 1.69895 | 30.07 |
| | +110.728 | | | |
| | | 3.131 | | |
| | PLANO | | | |
| 52 | | 2.500 | 1.62041 | 60.33 |
| | PLANO | | | |

EFL = 100, Aperture = F/1.104, Field of View = 25°

| Focal | 45 | 46 | 47 | 48 | 51 |
|---|---|---|---|---|---|
| Length Ratios: | +4.37F | +1.84F | −4.39F | +0.76F | −0.62F |

Focal length of elements 45 and 46 in combination=+1.31F

In these last examples the front part as a whole has a focal length as follows:

| Example | Focal length of front part |
|---|---|
| VI | +1.95F |
| VII | +1.80F |

It will be seen that in all the above examples employing a negative element of meniscus shape in the front part of the lens, i.e. Examples II to VII inclusive, that element is of relatively low power having a focal length at least 2.8 times that of the positive component (i.e. in Examples II to IV the single positive element 6, 18 and 23 respectively and in Examples V to VII the combination of two positive elements 35 and 36, and 45 and 46) of the front part of the lens. Specifically, the relationship between the powers of the positive component and the meniscus shape negative element which, as previously mentioned, produces overcorrect spherical aberration in an amount sufficient to correct the residual undercorrect spherical aberration from the rest of the optical system, is as follows:

EXAMPLE II

Positive element 6 focal length 2.900F
Negative meniscus element 7 focal length 8.326F
Negative meniscus element focal length 2.88 times that of positive element.

EXAMPLE III

Positive element 18 focal length 1.565F
Negative meniscus element 19 focal length 6.647F
Negative meniscus element focal length 4.25 times that of positive element.

EXAMPLE IV

Positive element 23 focal length 1.920F
Negative meniscus element 24 focal length 47.232F
Negative meniscus element focal length 24.60 times that of positive element.

EXAMPLE V

Positive component elements 35 and 36 combined focal length 1.59F
Negative meniscus element 37 focal length 24.203F
Negative meniscus element focal length 15.22 times that of positive component.

EXAMPLE VI

Positive component elements 46 and 46 combined focal length 1.41F
Negative meniscus element 47 focal length 4.78F
Negative meniscus element focal length 3.38 times that of positive component.

EXAMPLE VII

Positive component elements 45 and 46 combined focal length 1.31F
Negative meniscus element 47 focal length 4.39F
Negative meniscus element focal length 3.35 times that of positive component.

It will be appreciated that a relatively low power element meniscus in shape requires a relatively small volume of glass and can thus be light in weight.

What we claim is:

1. A modified Petzval lens having a focal length F, the lens having a front part comprising at least one positive element with a focal length between +1F and +3F and a negative element with a focal length between −1.2F and infinity, the focal length of the front part as a whole being between +1F and +6F and the negative element of the front part not being cemented to any other element and having a refractive index less than or equal to 0.13 greater than the refractive index of any positive element of the front part, a rear part comprising a positive singlet element with a focal length between +0.4F and +1.2F, and a field flattener behind the rear part and comprising a single negative element with a focal length between 0.4F and −1.1F.

2. A lens as claimed in claim 1 wherein the negative element in the front part is meniscus in shape.

3. A lens as claimed in claim 1 further having a middle part located between the front and rear parts, the middle part comprising a single positive element with a focal length between +1.4F and infinity.

4. A lens as claimed in claim 1 having an air gap of between 0.6F and 1.1F in front of the rear part.

5. A lens as claimed in claim 1 having an equivalent air gap of between 0.01F and 0.5F between the rear part and the field flattener.

6. A lens as claimed in claim 1 in which the front part has two positive elements.

7. A lens as claimed in claim 6 in which the front positive element in the front part has a focal length between +6F and infinity.

8. A head-up display incorporating a lens as claimed in claim 1.

9. A modified Petzval lens having a focal length F, the lens having a front part comprising a positive component consisting of at least one positive element with a focal length between +1F and +3F and a relatively weak meniscus shape negative element having a focal length at least 2.8 times that of said positive component and which produces overcorrect spherical aberration, the focal length of the front part as a whole being between +1F and +6F and the negative element of the front part not being cemented to any other element, a rear part comprising a positive singlet element with a focal length between +0.4F and +1.2F, and a field flattener behind the rear part and comprising a single negative element with a focal length between −0.4F and −1.1F.

10. A lens as claimed in claim 9 further having a middle part located between the front and rear parts, the middle part comprising a single positive element with a focal length between +1.4F and infinity.

11. A lens as claimed in claim 9 having an air gap of between 0.6F and 1.1F in front of the rear part.

12. A lens as claimed in claim 9 having an equivalent air gap of between 0.01F and 0.5F between the rear part and the field flattener.

13. A lens as claimed in claim 9 in which the positive component of the front part consists of two positive elements.

14. A lens as claimed in claim 13 in which the front positive element in the front part has a focal length between +6F and infinity.

15. A head-up display incorporating a lens as claimed in claim 9.

16. A modified Petzval lens comprising lens elements 1 to 5 having faces with radii of curvature, axial thicknesses and separations, refractive indices $N_d$, and Abbe numbers $V_d$, substantially in accordance with the following table:

| ELEMENT | RADIUS | AXIAL THICKNESS/ SEPARATION | REFRACTIVE INDEX $N_d$ | ABBE NUMBER $V_d$ |
|---|---|---|---|---|
| 1 | +146.608 | 18.774 | 1.62040 | 60.3 |
|   | −132.244 | 2.772 |   |   |

-continued

| ELE-MENT | RADIUS | AXIAL THICKNESS/ SEPARATION | REFRACTIVE INDEX Nd | ABBE NUMBER Vd |
|---|---|---|---|---|
| 2 | −115.569 | 2.903 | 1.74842 | 27.8 |
|   | +744.569 | 0.138 |  |  |
| 3 | +117.416 | 13.396 | 1.68880 | 49.5 |
|   | −1530.615 | 89.823 |  |  |
| 4 | +38.031 | 11.087 | 1.74400 | 44.7 |
|   | +4964.771 | 4.404 |  |  |
| 5 | −140.909 | 1.106 | 1.70035 | 30.3 |
|   | +46.980 |  |  |  | said lens having an effective focal length of 100, aperture of F/1.08 and field of view of 20°.

17. A modified Petzval lens comprising lens elements 6 to 10, and having a prism 12 with associated lens element 17 interposed between the lens elements 9 and 10, wherein the elements have faces with radii of curvature, axial thicknesses and separations, refractive indices Nd, and Abbe numbers Vd, which substantially accord with the following table:

| ELE-MENT | RADIUS | AXIAL THICKNESS/ SEPARATION | REFRACTIVE INDEX Nd | ABBE NUMBER Vd |
|---|---|---|---|---|
| 6 | +132.916 | 15.676 | 1.51650 | 64.2 |
|   | +1088.136 | 16.692 |  |  |
| 7 | −154.232 | 5.080 | 1.62096 | 35.9 |
|   | −215.741 | 0.290 |  |  |
| 8 | +113.331 | 21.191 | 1.51650 | 64.2 |
|   | PLANO | 71.847 |  |  |
| 9 | +50.157 | 13.063 | 1.71300 | 53.8 |
|   | +205.750 | 2.758 |  |  |
| 12 + 10 (12 + 17) | PLANO | 29.668 (34.835) | 1.80518 | 25.4 |
|   | +81.543 |  |  |  | said lens having an effective focal length of 100, aperture of F/0.8 and field of view of 20°.

18. A modified Petzval lens comprising lens elements 18 to 21, and having a prism 22 interposed between the lens elements 20 and 21, wherein the elements have faces with radii of curvature, axial thicknesses and separations, refractive indices Nd, and Abbe numbers Vd, which substantially accord with the following table:

| ELE-MENT | RADIUS | AXIAL THICKNESS/ SEPARATION | REFRACTIVE INDEX Nd | ABBE NUMBER Vd |
|---|---|---|---|---|
| 18 | +120.567 | 21.885 | 1.71300 | 53.8 |

-continued

| ELE-MENT | RADIUS | AXIAL THICKNESS/ SEPARATION | REFRACTIVE INDEX Nd | ABBE NUMBER Vd |
|---|---|---|---|---|
|   | −1506.931 | 7.003 |  |  |
| 19 | −269.096 | 5.107 | 1.58406 | 37.0 |
|   | −865.060 | 100.672 |  |  |
| 20 | +47.597 | 21.885 | 1.74400 | 44.7 |
|   | +1714.869 | 0.730 |  |  |
| 22+21 | PLANO | 32.098 | 1.95250 | 21.5 |
|   | +72.951 |  |  |  | said lens having an effective focal length of 100, aperture of F/0.8 and field of view of 20°.

19. A modified Petzval lens comprising elements 23 to 26 having faces with radii of curvature, axial thicknesses and separations, refractive indices Nd, and Abbe numbers Vd, substantially in accordance with the following table:

| ELE-MENT | RADIUS | AXIAL THICKNESS/ SEPARATION | REFRACTIVE INDEX Nd | ABBE NUMBER Vd |
|---|---|---|---|---|
| 23 | +150.787 | 8.688 | 1.62040 | 60.3 |
|   | −565.064 | 12.698 |  |  |
| 24 | −69.808 | 4.277 | 1.51742 | 52.2 |
|   | −73.358 | 65.040 |  |  |
| 25 | +49.807 | 18.045 | 1.51650 | 64.2 |
|   | +320.733 | 42.481 |  |  |
| 26 | −38.163 | 1.711 | 1.74877 | 27.8 |
|   | −106.497 |  |  |  | said lens having an effective focal length of 100, aperture of F/1.25 and field of view of 20°.

20. A modified Petzval lens comprising lens elements 35 to 39 having faces with radii of curvature, axial thicknesses and separations, refractive indices Nd, and Abbe numbers Vd, substantially in accordance with the following table:

| ELE-MENT | RADIUS | AXIAL THICKNESS/ SEPARATION | REFRACTIVE INDEX Nd | ABBE NUMBER Vd |
|---|---|---|---|---|
| 35 | +443.085 | 7.971 | 1.63854 | 55.5 |
|   | +15816.588 | 0.145 |  |  |
| 36 | +105.648 | 16.667 | 1.71300 | 53.8 |
|   | +348.241 | 15.217 |  |  |
| 37 | −192.474 | 5.072 | 1.48749 | 70.4 |
|   | −231.826 | 91.487 |  |  |
| 38 | +35.450 | 20.290 | 1.78443 | 43.9 |
|   | +115.490 |  |  |  |

-continued

| ELE-MENT | RADIUS | AXIAL THICKNESS/ SEPARATION | REFRACTIVE INDEX Nd | ABBE NUMBER Vd |
|---|---|---|---|---|
| | | 4.007 | | |
| 39 | +94.291 | 1.739 | 1.74842 | 27.8 |
| | +36.232 | | | | said lens having an effective focal length of 100, aperture of F/0.8 and field of view of 20°.

21. A modified Petzval lens comprising lens elements 45 to 48 and 51, and having a prism 49 and block 50 interposed between the lens elements 48 and 51, wherein the elements have faces with radii of curvature, axial thicknesses and separations, refractive indices Nd, and Abbe numbers Vd, which substantially accord with the following table:

| ELE-MENT | RADIUS | AXIAL THICKNESS/ SEPARATION | REFRACTIVE INDEX Nd | ABBE NUMBER Vd |
|---|---|---|---|---|
| 45 | +338.430 | 5.328 | 1.48749 | 70.41 |
| | +1200.222 | 0.355 | | |
| 46 | +123.338 | 15.484 | 1.48749 | 70.41 |
| | −220.187 | 3.552 | | |
| 47 | −152.639 | 3.374 | 1.80518 | 25.43 |
| | −253.324 | 87.036 | | |
| 48 | +64.220 | 19.581 | 1.71300 | 53.83 |
| | −962.743 | 7.773 | | |
| 49 | PLANO | 15.096 | 1.80518 | 25.43 |
| 50 | PLANO | 13.155 | 1.62096 | 35.90 |
| | PLANO | 4.700 | | |
| 51 | −71.339 | 1.539 | 1.80518 | 25.43 |
| | +246.062 | | | | said lens having an effective focal length of 100, aperture of F/1.10 and field of view of 20°.

22. A modified Petzval lens comprising lens elements 45 to 48 and 51, and having a prism 49 and block 50 interposed between the lens elements 48 and 51, wherein the elements have faces with radii of curvature, axial thicknesses and separations, refractive indices Nd, and Abbe numbers Vd, substantially in accordance with the following table:

| ELE-MENT | RADIUS | AXIAL THICKNESS/ SEPARATION | REFRACTIVE INDEX Nd | ABBE NUMBER Vd |
|---|---|---|---|---|
| 45 | +171.490 | 6.803 | 1.48749 | 70.41 |
| | +846.481 | 0.363 | | |
| 46 | +125.746 | 13.606 | 1.48749 | 70.41 |
| | −301.450 | 3.628 | | |
| 47 | −201.061 | 3.447 | 1.80518 | 25.43 |
| | −462.319 | 87.076 | | |
| 48 | +60.234 | 19.955 | 1.71300 | 53.83 |
| | −464.676 | 0.363 | | |
| 49 | PLANO | 15.420 | 1.80518 | 25.43 |
| 50 | PLANO | 6.794 | 1.62096 | 36.18 |
| | PLANO | 7.987 | | |
| 51 | −73.347 | 1.814 | 1.69895 | 30.07 |
| | +110.728 | | | | said lens having an effective focal length of 100, aperture of F/1.104 and field of view of 25°.

23. A modified Petzval lens having a focal length F, the lens having a front part comprising at least one positive element with a focal length between +1F and +3F and a negative element of focal length between −1.2F and infinity, and of at least 2.8 times that of the positive component and which produces overcorrect spherical aberration, the focal length of the front part as a whole being between +1F and +6F and the negative element of the front part not being cemented to any other element and having a refractive index less than or equal to 0.13 greater than the refractive index of any positive element of the front part, a rear part comprising a positive singlet element with a focal length between +0.4F and +1.2F, and a field flattener behind the rear part and comprising a single negative element with a focal length between 0.4F and −1.1F.

* * * * *

UNITED STATES PATENT AND TRADEMARK OFFICE
CERTIFICATE OF CORRECTION

PATENT NO. : 4,232,943
DATED : November 11, 1980
INVENTOR(S) : Phillip J. Rogers It is certified that error appears in the above–identified patent and that said Letters Patent are hereby corrected as shown below:

Col. 3, line 38, delete "elements" and substitute therefor "element 8".

Col. 9, lines 51-53, delete column heading "CONSTRINCENCE" and substitute therefor "CONSTRINGENCE".

Col. 9, line 66, in column headed "REFRACTIVE Nd", delete "1.71500" and substitute therefor "1.71300".

Col. 10, lines 2-4, delete column heading "CONSTRINCENCE" and substitute therefor "CONSTRINGENCE".

Signed and Sealed this

Eleventh Day of June 1985

[SEAL]

Attest:

DONALD J. QUIGG

Attesting Officer     Acting Commissioner of Patents and Trademarks